United States Patent [19]

Tierney et al.

[11] Patent Number: 4,766,299
[45] Date of Patent: Aug. 23, 1988

[54] HAND-MOUNTED BAR CODE READER

[75] Inventors: Danial J. Tierney, Eugene; P. Guy Howard, Junction City, both of Oreg.

[73] Assignee: Spectra-Physics, Inc., San Jose, Calif.

[21] Appl. No.: 845,677

[22] Filed: Mar. 28, 1986

[51] Int. Cl.$^4$ .............................................. G06K 7/10
[52] U.S. Cl. .................................. 235/472; 235/462; 362/103
[58] Field of Search ................ 235/472, 462; 362/103, 362/190; 224/219, 267

[56] References Cited

U.S. PATENT DOCUMENTS

| | | | |
|---|---|---|---|
| 1,709,850 | 4/1929 | Hodecker | 362/103 X |
| 3,978,318 | 8/1976 | Romeo et al. | 235/472 X |
| 4,652,750 | 3/1987 | Eastman et al. | 235/472 X |

Primary Examiner—David L. Trafton
Attorney, Agent, or Firm—Donald C. Feix; T. M. Freiburger; Paul Davis

[57] ABSTRACT

A hand worn laser bar code reader scanner device is of compact design and adapted to be worn comfortably on the back of the hand of the user. A switch associated with the laser is attached to a hand strap such that the bar code reader is switched on and off by deliberate flexure of muscles in the user's hand. This enables the user to point his hand in a natural manner toward the bar code subject matter to be read, and, through the automatic switch, frees the fingers of his hand for use on other operations without removal of the laser device from the hand.

3 Claims, 1 Drawing Sheet

U.S. Patent     Aug. 23, 1988     4,766,299
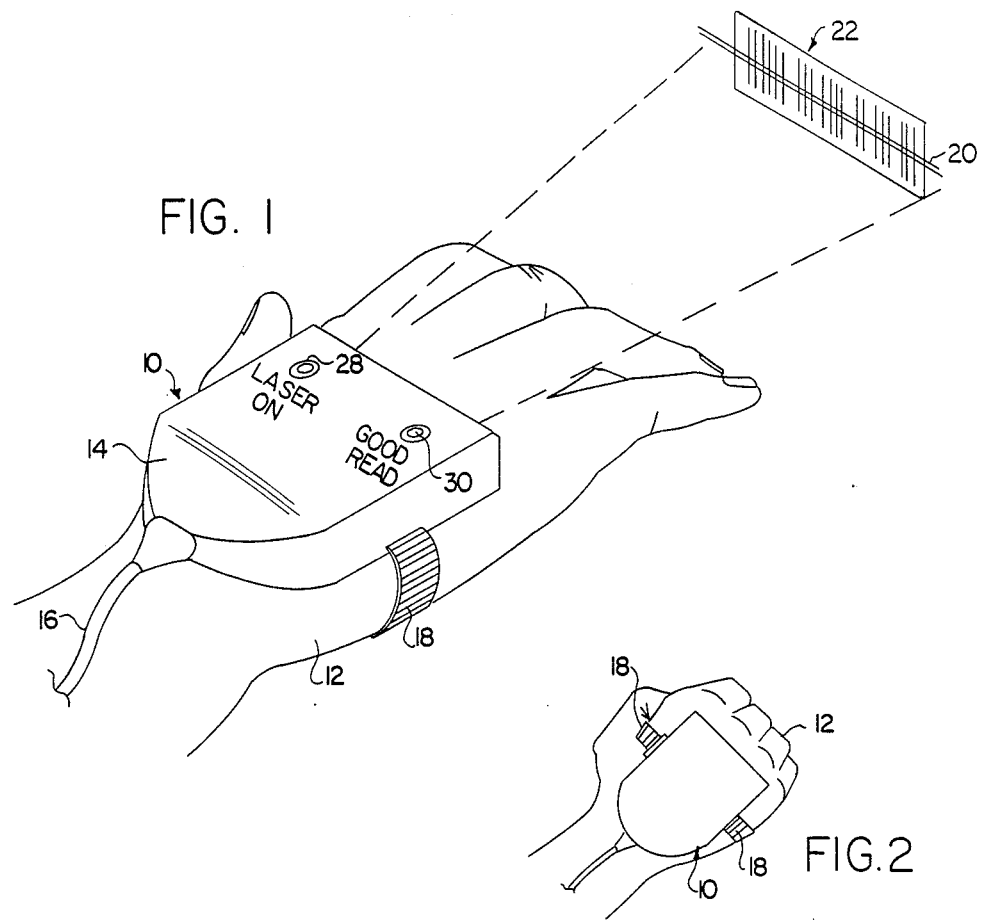
FIG. 1
FIG. 2
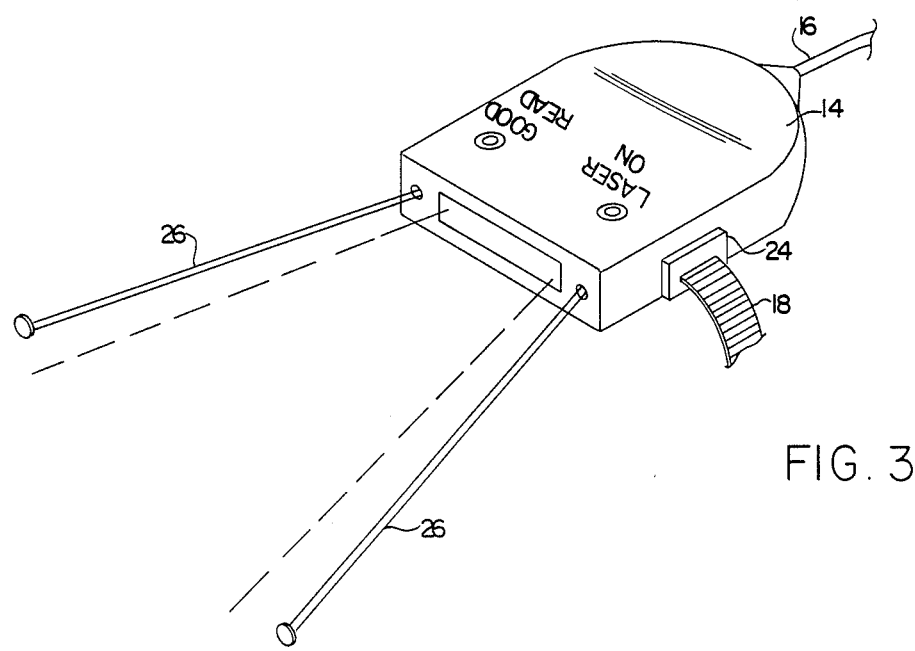
FIG. 3

HAND-MOUNTED BAR CODE READER

BACKGROUND OF THE INVENTION

The invention relates to laser bar code readers, and particularly to scanning, portable laser bar code readers.

Hand-held laser bar code readers are in an increasing use for efficient reading of information on containers in warehouses and other stock and inventory control situations. Modern hand held laser bar code readers have scanning mechanisms for scanning the beam, either reciprocally in a single plane to form a single scan line or in a raster pattern or other patterns wherein a plurality of non-parallel scan lines are formed.

Often, the operator of a hand held laser bar code scanner must read information from bar codes, then periodically enter data on a keyboard, or otherwise use the fingers of his hand for operations relating to the general work being undertaken. With conventional hand held laser bar code readers, this has required laying down the bar code reader temporarily, or switching it to the other hand, to facilitate the use of the hand for other operations. In the case of keyboard entry, efficient operation requires the use of the fingers of both hands simultaneously, necessitating the setting aside of the bar code reader.

Such laser bar code readers could be much more efficiently employed if they could remain in or on the hand while still freeing the fingers for keyboard entry or other operations in conjunction with the tasks in which the user is involved. It is an object of the invention to produce a portable bar code reader scanner device capable of such operation.

SUMMARY OF THE INVENTION

In accordance with the present invention, a laser bar code scanner device is adapted to be worn on the back of a human hand. The scanner device comprises a compact laser scanner including a laser for projecting a beam, a beam scanner, a housing surrounding the laser, and a connection to a power supply. There are included switch means for energizing the laser. A hand strap connected to the housing is of a length sufficient to extend around the hand to retain the housing on the back of the hand in such a position to project a scanning beam forward generally in the direction of the natural pointing of the hand and arm. In association with the strap and switch means, there are included means for activating the switch means to energize the laser upon a deliberate flexure of muscles in the hand.

The muscle flexure may comprise the pointing of a finger, such as in the direction of the bar code to be read, with appropriate sensing apparatus and the strap to activate the switch upon such a gesture.

Alternatively, the switch may be activated by other deliberate manual gestures, such as the clenching of the hand into a fist.

Therefore, in accordance with the invention, the fingers of the hand bearing the laser scanner device are completely freed for other activities such as data entry. Both arms of the user are available, while at the same time the laser scanner device is instantly available for identifying data.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 1 is a view generally in perspective showing a laser bar code reader mounted on the back of a hand of a user, and indicating a scanning beam pattern being projected on the reader.

FIG. 2 is a perspective view showing hand-mounted laser scanner unit, with a hand clenched into a fist to activate an on/off switch of the scanner.

FIG. 3 is a perspective view showing the front end of the laser bar code reader, with the exit window for the scanning beam, and showing a special strap which secures the bar code reader to the hand.

DESCRIPTION OF A PREFERRED EMBODIMENT

In the drawings, FIG. 1 shows a hand-mounted laser bar code scanner generally identified by the reference number 10, secured to the back of a user's hand 12. The bar code reader of scanner 10 includes a housing 14, an internal laser and scanning mechanism and return signal detection system (not shown) for producing the desired scan line or pattern and reading bar codes, an electrical cord 16 leading to a power supply for the laser and to a data recording device which may be separate from the housing 14, and a strap 18 for securing the bar code reader 10 to the back of the hand.

The scanner device 10 is shown in FIG. 1 projecting a scan line 20 transversely across a bar code 22 of the ordinary type comprising alternate and variable spaced and sized reflective and non-reflective bars.

FIG. 2 shows the laser scanner 10, still attached to the user's hand 12, but with the hand clenched into a fist. This deliberate manual gesture flexes certain muscles of the hand, expanding the circumference of the hand at the location of the strap 18, and causes a switch associated with the scanner to energize or de-energize the laser. This enables the user to simply point his wrist and arm at a bar (such as the bar code 22) to be read and clench his hand into a fist to activate the laser. The laser may be turned off by repeating the same gesture.

FIG. 3 is a perspective view from the front side of the laser bar code scanner, showing the connection of the strap 18 and indicating a special switch 24 which may be mounted on one side of the scanner's housing 14 and to which the mounting strap 18 is connected. The switch 24 may be sensitive to surges of tension in the strap 18, so that the flexure of the hand causes the switch to energize or de-energize the laser.

Alternatively, the strap 18 can include a more sophisticated switching arrangment such as a tension or pressure-sensitive resistance element contained in the strap, with a small amount of current continually passed through the strap. The resistance element is then connected in a circuit so as to operate a relay switch when there are significant changes in the resistance. Similarly, other forms of switching arrangements can be used.

As also shown in FIG. 3, the scanning beam may be a radiation frequency above or below the visible spectrum, such as an infrared laser beam. In this case, there are provided one or a pair of pointing beams 26 on either side of the invisible scanning beam, so that the operator has a visible marker with which to direct the scanner. The pointing beams 26 may be of any suitable conventional type, such as incandescent beams, LED's, lasers or other appropriate sources of light.

FIGS. 1 and 3 also show that the scanner 10 may include indicators 20, 28 and 30 on the side of the housing facing the user. For example, as indicated in the drawings, the indicator 28 may be a "LASER ON" indicator light, while the indicator 30 may comprise a "GOOD READ" indicator light, confirming that the bar code has been properly read.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A laser bar code scanner device adapted to be worn on the back of a human hand, comprising,
    a compact laser bar code scanner including a laser for projecting a beam, a laser beam scanner, a housing surrounding the laser and scanner, and a connection to a power supply,
    switch means for energizing the laser,
    a hand strap connected to the housing, and of a length sufficient to extend around the hand to retain the housing on the back of the hand in a position to project a scanning beam forward generally in the direction of the natural pointing of the hand and arm, and
    means associated with the strap and the switch means for activating the switch means to energize the laser upon a deliberate flexure of muscles in the hand.

2. A laser bar code scanner device according to claim 1, wherein the means associated with the strap includes means for activating the switch upon the formation of the hand into a clenched fist, with a significant increase in tension in the strap.

3. A laser bar code scanner device according to claim 1, wherein the laser beam scanned is an invisible beam, and further including means for generating a pair of marker beams positioned and oriented so that one marker beam projects at each end of the scanner laser beam as it is projected onto a label to be read, indicating to the operator a line along which the beam is being scanned.

* * * * *